(No Model.)
J. SHAW.
RAILROAD CAR.
No. 569,676.  Patented Oct. 20, 1896.
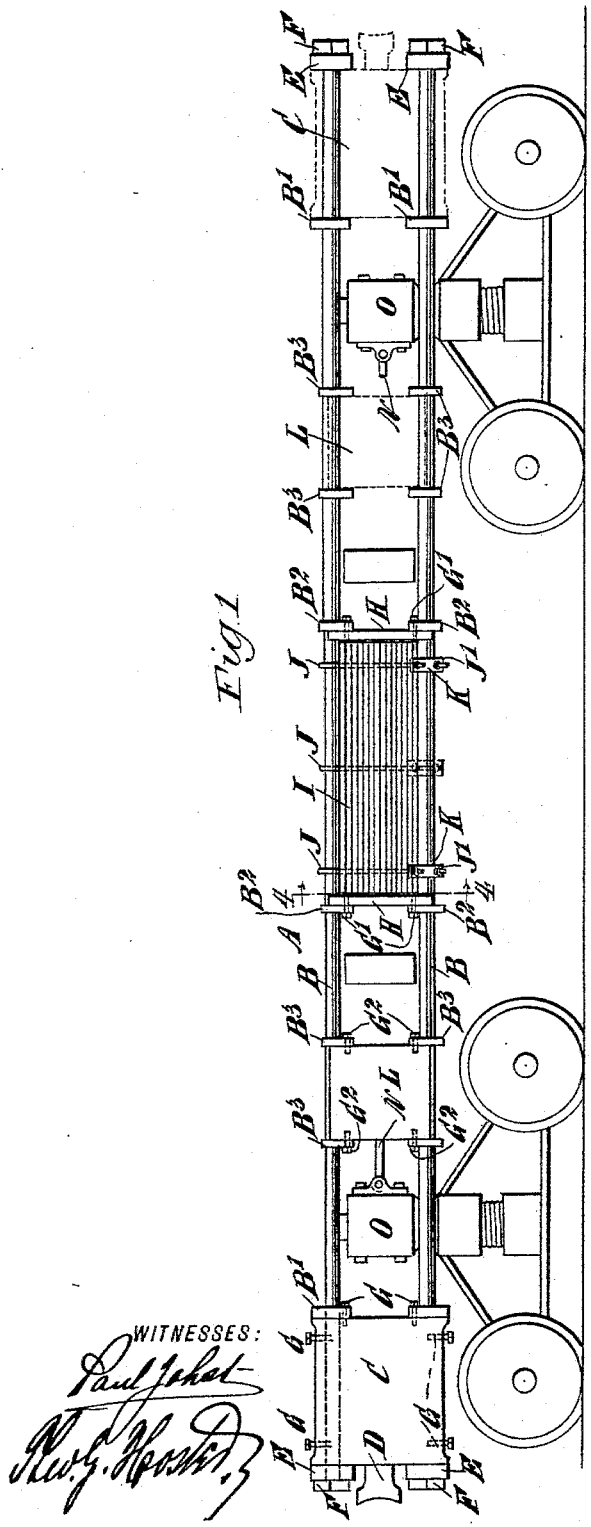
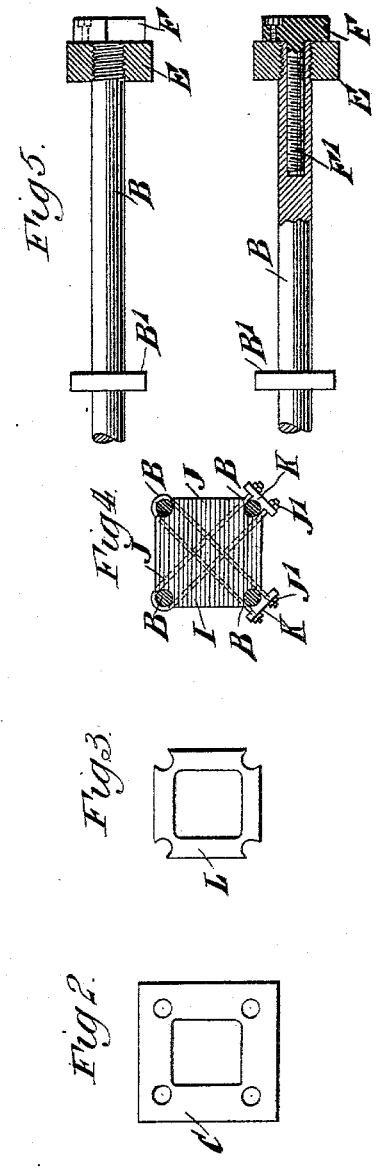
WITNESSES:
INVENTOR
J. Shaw
BY
ATTORNEYS

UNITED STATES PATENT OFFICE.

JOHN SHAW, OF WOODBURN, OREGON.

RAILROAD-CAR.

SPECIFICATION forming part of Letters Patent No. 569,676, dated October 20, 1896.

Application filed January 16, 1896. Serial No. 575,696. (No model.)

*To all whom it may concern:*

Be it known that I, JOHN SHAW, of Woodburn, in the county of Marion and State of Oregon, have invented certain new and useful Improvements in Railroad-Cars, of which the following is a full, clear, and exact description.

The invention relates to improvements in railroad-cars such as shown and described in the application for Letters Patent of the United States, Serial No. 558,897, filed by me August 10, 1895, and allowed on November 14, 1895.

The object of the present invention is to simplify the construction of the draw-frame described in the application above referred to, to permit of conveniently removing any desired part of the frame for repairs or other purposes.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a side elevation of the improvement with parts omitted. Fig. 2 is a face view of the draw-head. Fig. 3 is a like view of one of the spring-casings. Fig. 4 is a cross-section of the improvement on the line 4 4 of Fig. 1, and Fig. 5 is an enlarged sectional side elevation of the frame-rods.

The car on which the improvement is applied is provided on the under side of its body with longitudinally-extending sets of upper and lower tubes or pipes B, engaging at their outer ends the draw-heads C, each containing the usual draw-bar D. Each draw-head C abuts with its rear face on fixed shoulders or collars B', held on the rods or tubes B, and the forward face of each draw-head is engaged by nuts E, screwing on the outer threaded ends of the rods or tubes B to securely hold the draw-head in place on the rods between said collars B' and the nuts E.

In order to lock the nuts E in place, I engage the nuts with the head F of a bolt F', screwing centrally in the corresponding rod B and having threads in an opposite direction to the threads on rod B, on which screws the nut F. (See Fig. 5.) Each draw-head C is also provided with a number of set-screws G, engaging the rods or tubes B, and similar set-screws are arranged in the collars B' for engaging the inner end of the draw-head, as shown in Fig. 1, to securely fasten the draw-head in place. Ties H for connecting the rods or tubes B with each other at or near the middle thereof are formed at their corners with recesses for engagement with the tubes or rods, the construction being similar to that shown in Fig. 3, said ties resting with their outer faces against collars $B^2$, secured on the rods or tubes and similar to the collars B'. Bolts G' connect the collars with said ties to hold the latter securely in place.

Between the two ties H is arranged a block I of wood, having its corners recessed to form seats for the tubes or rods B, as plainly indicated in Fig. 4, said block being securely held in place by clamping-bolts J passing diagonally through the block to connect the two diagonal tubes or rods with each other. The clamping-plate K for each bolt J is concaved at its inner face to engage the corresponding tube, it being understood that the clamping-plate is pressed in position by screwing the nuts on the bolt J. The spring-casings L are likewise cut out at the corners to form seats for the tubes B, said spring-casings being each held between two collars $B^3$, and each of the tubes B and set-screws or bolts $G^2$ are employed for connecting said collars $B^3$ with the ends of the casing.

The spring-casing L is provided inside with springs similar to those shown in the application above referred to, and the rod N, connected with the springs, is pivotally connected with a transverse beam or timber O, attached to the car and extending between the upper and lower rods or tubes B.

It will be seen that by the arrangement described the frame A is composed of a number of pieces securely fastened together to insure great strength of the frame and to permit of conveniently repairing the frame in case any of its parts are broken.

Having thus fully described my invention, I claim as new and desire to secure by Letters Patent—

1. A railroad-car, provided with a longitudinally-extending draw-frame comprising sets of upper and lower tubes, a block formed with longitudinal seats for part of the said rods, and clamping-bolts connecting diagonal tubes with each other and passing through said block, substantially as shown and described.

2. A railroad-car, provided with a longitudinally-extending frame comprising longitudinal rods having fixed collars, a spring-frame formed with longitudinal seats at its corners for said rods or tubes, and means for fastening said collars and spring-frame together, substantially as shown and described.

3. Draft mechanism for railway-cars, the mechanism comprising four parallel rods having rectangular relation to each other, a draw-head having longitudinal passages through which the rods respectively pass, and means for rigidly securing the draw-head to the rods, substantially as described.

4. Draft mechanism for railway-cars, the mechanism comprising four parallel rods having rectangular relation to each other, a block having longitudinal grooves respectively receiving the rods, ties located at each end of the block and connecting the rods, and U-shaped clamping-bolts connected to a portion of the rods and respectively extending diagonally to the diagonally-opposite rods to which the clamping-bolts are also connected, substantially as described.

5. Draft mechanism for railway-cars, the mechanism comprising parallel longitudinal rods, a block having longitudinal grooves respectively receiving the rods, the blocks being interposed between the rods, and clamp-bolts secured to the rods and passed diagonally through the block and connected with the respective diagonally-opposite rods, substantially as described.

JOHN SHAW.

Witnesses:
CHAS. SCOTT,
R. H. SCOTT, Jr.